Patented Feb. 6, 1951

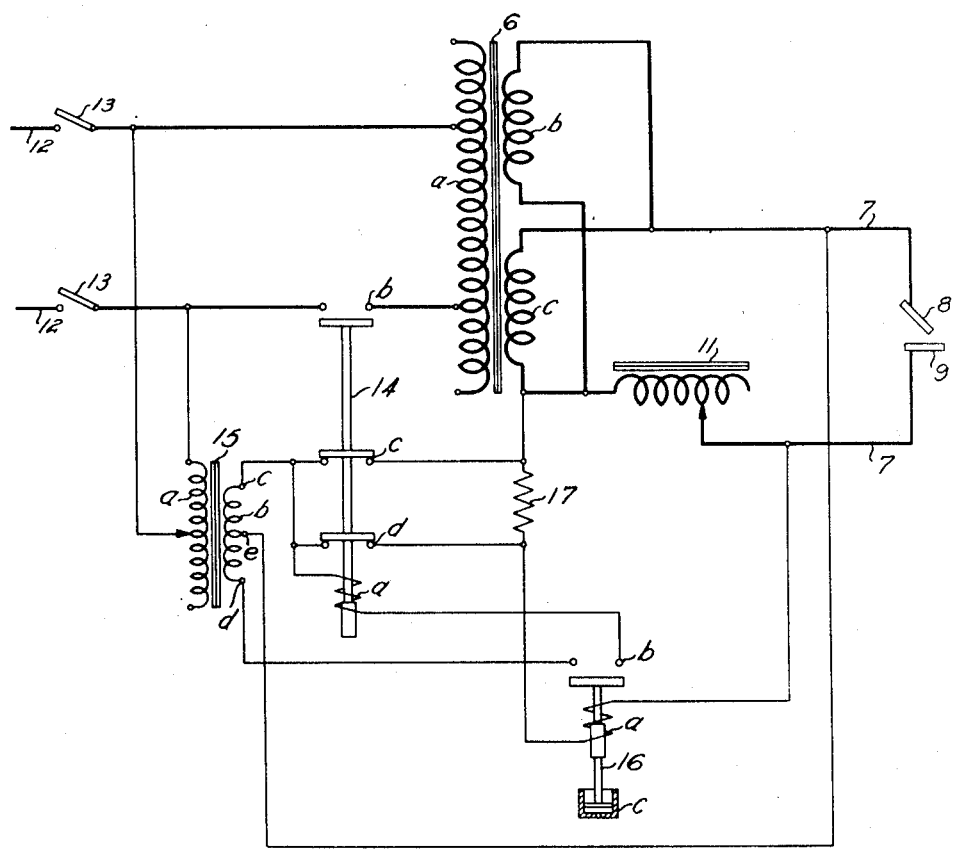

2,540,838

UNITED STATES PATENT OFFICE 2,540,838

WELDING TRANSFORMER CONTROL SYSTEM

Henry W. Snyder, West Allis, Wis., assignor to Allis-Chalmers Manufacturing Company, Milwaukee, Wis., a corporation of Delaware Application March 29, 1946, Serial No. 658,048

6 Claims. (Cl. 323—57)

This invention relates in general to improvements in control systems for welding transformers, and more particularly to means for reducing the voltage of a welding transformer while the transformer is not carrying load current.

The supply of alternating current to welding electrodes is frequently effected through a transformer having a secondary open circuit voltage of such magnitude as to constitute, under favorable circumstances, a substantial hazard to a human being touching both electrodes simultaneously. It is therefore desirable to energize the transformer at reduced voltage while the transformer is not carrying load current.

Control systems for performing the latter function generally comprise switching devices such as contactors and relays which are provided with operating coils. To insure that the welding transformer is not accidentally energized at full voltage in response to burning out of an operating coil, the system should be so designed that such energization takes place only in response to energization of the operating coils at sufficient voltage to cause operation of the switching devices of which they are a part. The impedance of an operating coil increasing several fold upon operation of the associated armature, there is also a danger that a coil may burn out if it is energized for a substantial length of time at a voltage insufficient to cause operation of the switching device of which it is a part.

For the reasons above set forth, it is advantageous to provide a system of the character herein considered with switching devices whose coils are substantially entirely deenergized while the welding transformer is idle. In a preferred embodiment of the invention the coil of the switching device initiating the impression of full voltage on the welding transformer is connected across impedance means such as an inductive reactor joining the welding transformer secondary winding to the welding circuit so that the coil is at least substantially entirely deenergized when the welding circuit is without current.

It is therefore an object of the present invention to provide an improved system for reducing the open circuit voltage of a welding transformer in which the coils of all switching devices are deenergized while the transformer is idle.

Another object of the present invention is to provide an improved system for reducing the open circuit voltage of a welding transformer in which burning out of an actuating coil of a switching device will prevent energization of the welding transformer at full voltage.

Objects and advantages other than those above set forth will be apparent from a consideration of the following description when read in connection with the accompanying drawing which diagrammatically illustrates one embodiment of the present invention applied to the control of a welding transformer adapted to be energized at voltages of different values.

Referring more particularly to the drawing by characters of reference, numeral 6 designates a welding transformer provided with a primary winding 6a and with parallel secondary windings 6b, 6c. The secondary windings are connected with a welding circuit 7 for supplying current to a pair of electrodes 8, 9 of which electrode 8 is assumed to be a rod of weld metal and electrode 9 the work to be welded. The flow of current through electrodes 8, 9 is adjustably limited by suitable impedance means, such as an adjustable reactor 11 of any suitable type. The reactor core may be distinct from the core of transformer 6, or the two cores may comprise a common portion. In the latter instance the reactor winding and windings 6a, 6b, 6c may be inductively related to a limited extent.

Winding 6a is provided with a plurality of pairs of terminals which may be selectively connected with a source of alternating current, such as a circuit 12 energized from a suitable generator (not shown) through connections which may include disconnecting switches 13 and the main contacts 14b of a contactor switch 14, to cause energization of circuit 7 at the normal operating voltage thereof.

Circuit 7 may also be energized at a voltage lower than the normal open circuit voltage of winding 6b, 6c by means of an auxiliary transformer 15. The primary winding 15a of transformer 15 may be energized from circuit 12 and is therefore provided with different voltage taps to permit energization thereof at different voltages without changing the value of the voltage induced in the associated secondary winding 15b. The latter winding is provided with terminals 15c, 15d and with a tap 15e. One of the conductors of circuit 7 is connected with tap 15e through a low resistance connection and the other conductor of circuit 7 is connected with one of terminals of windings 15b through reactor 11 and contacts 14c of switch 14.

Operating coil 14a of switch 14 may be energized from any suitable source and is conveniently connected between terminals 15c, 15d through contacts 16b of a relay 16. The coil 16a of relay 16 is connected across reactor 11 through contacts 14c, 14d to cause relay 16 to close contacts 16b in response to the flow of current through reactor 11. The speed of operation of relay 16 may be established at any desired value by proper choice of the relay elements, which may include any suitable known delaying means conventionally represented as a dashpot 16c. Suitable impedance means such as a resistor 17 may be inserted in series with coil 16a by opening of contacts 14c, 14d to limit the heating of coil 16a when the coil is energized.

In operation, circuit 12 being energized and switches 13 being closed, transformer 15 is energized from circuit 12 but winding 6a remains operatively disconnected from circuit 12 as long as contacts 14b are open. A reduced voltage depending upon the choice of tap 15e is then impressed from winding 15b on the circuit extending from tap 15e through one of the conductors of circuit 7, windings 6b, 6c and contacts 14c to terminal 15c. Tap 15e is so chosen that the voltage thus impressed on circuit 7 and electrodes 8, 9 is of such low value as not to constitute a substantial hazard to human life. No load current flows through reactor 11 and coil 16a remains deenergized as long as electrodes 8, 9 are not brought into engagement, except for a negligible amount of current which may be supplied to coil 16a from reactor 11 as a result of any inductive relation between the reactor winding and the windings of transformer 6. Coil 14a is then entirely deenergized.

Welding operation may be initiated by bringing electrode 8 in contact with electrode 9. Winding 15b then supplies a substantial current to circuit 7 through contacts 14c and reactor 11. The voltage drop in reactor 11 is impressed on coil 16a to cause switch 16 to close contacts 16b. Coil 14a is thereby connected across terminals 15c, 15d, and switch 14 opens contacts 14c, 14d and closes contacts 14b. Opening of contacts 14c disconnects circuit 7 from winding 15b. Closing of contacts 14b causes winding 6a to be energized at the full voltage of circuit 12, whereby normal operating voltage is induced in windings 6b, 6c and is impressed on circuit 7 through reactor 11.

Electrodes 8, 9 may then be separated to draw a welding arc therebetween. Welding operation at normal voltage causes the voltage drop in reactor 11 to be increased beyond the value thereof resulting from energization of circuit 7 from winding 15b and short circuiting of electrodes 8, 9. Opening of contacts 14c, 14d causes resistor 17 to be inserted in series with coil 16a to adjust the current of the coil within the proper range of value for maintaining contact 16b closed without danger of overheating coil 16a.

When the flow of current through circuit 7 is interrupted by separation of electrodes 8, 9 beyond a predetermined distance, the voltage of circuit 7 abruptly increases to a value which may be considered to constitute a hazard to human life. The voltage of reactor 11 drops to zero or, at least, to a negligible value, thereby causing relay 16 to open contacts 16b after a predetermined time delay. Coil 14a is entirely deenergized and switch 14 returns to the position shown to disconnect winding 6a from circuit 12 and reconnect circuit 7 with winding 15b. Circuit 7 is then again energized at reduced voltage and another welding operation may be initiated in the manner above set forth by engagement of electrodes 8, 9.

It will be apparent that if either coil 14a or coil 16a burns out or otherwise becomes open circuited, switch 14 must remain in the open position shown or return to such position, so that accidental energization of circuit 7 while the circuit does not carry load current cannot take place.

Although but one embodiment of the present invention has been illustrated and described, it will be apparent to one skilled in the art that various changes and modifications may be made therein without departing from the spirit of the invention or from the scope of the appended claims.

It is claimed and desired to secure by Letters Patent:

1. In a control system for a welding transformer comprising a primary winding to be connected to a source of alternating current and a secondary winding having a normal open circuit voltage of dangerously high value connected to a welding circuit through impedance means, the combination of a switch for connecting said primary winding with said source, transformer means connecting said secondary winding with said source for impressing on said secondary winding a voltage of safe value below the said normal open circuit voltage thereof, and means responsive to the voltage drop in said impedance means operable upon short circuiting of said welding circuit for disconnecting said secondary winding from said transformer means and causing closure of said switch.

2. In a control system for a welding transformer comprising a primary winding to be connected to a source of alternating current and a secondary winding having a normal open circuit voltage of dangerously high value connected to a welding circuit through impedance means, the combination of a switch for connecting said primary winding with said source, transformer means connecting said secondary winding with said source for impressing on said secondary winding a voltage of safe value below the said normal open circuit voltage thereof, and means comprising an operating coil connected across said impedance means for disconnecting said secondary winding from said transformer means and causing said switch to be closed in response to the flow of current through said impedance means.

3. In a control system for a welding transformer comprising a primary winding to be connected to a source of alternating current and a secondary winding connected to a welding circuit through impedance means, the combination of a switch for connecting said primary winding with said source, transformer means connecting said secondary winding with said source for impressing on said secondary winding a voltage below the normal open circuit voltage thereof, an operating coil connected across said impedance means, a second impedance means, and means responsive to energization of said operating coil for disconnecting said secondary winding from said transformer means, closing said switch, and connecting said second impedance means in series with said operating coil.

4. In a control system for a welding transformer comprising a primary winding to be connected to a source of alternating current and a secondary winding connected to a welding circuit through an inductive reactor, the combination of a switch for connecting said primary winding with said source, said switch being provided with an operating coil, an auxiliary transformer connected with said secondary winding and with said source for impressing on said secondary winding a voltage below the normal open circuit voltage thereof, a relay for connecting said operating coil with said auxiliary transformer to cause closure of said switch, said relay comprising a second operating coil, means including contacts controlled by said switch connecting said second operating coil across said reactor to cause operation of said relay in response to the flow of current through said welding circuit, a resistor connected across said contacts to limit the flow of current through said second operating coil when said switch is closed, and further contacts controlled by said switch for disconnecting said welding circuit from said auxiliary transformer in response to closing operation of said switch.

5. In a control system for a welding transformer comprising a primary winding to be connected to a source of alternating current and a secondary winding having a normal open circuit voltage of dangerously high value connected to a welding circuit through an inductive reactor, the combination of a switch for connecting said primary winding with said source, said switch being provided with an operating coil, an auxiliary transformer having a primary winding connected with said source and a secondary winding, terminals for said auxiliary transformer secondary winding, certain of said terminals being connected with said welding transformer secondary winding for impressing on said welding transformer secondary winding a voltage of safe value below the said normal open circuit voltage thereof, a relay for connecting said switch coil with another of said terminals of said auxiliary transformer secondary winding for impressing on said switch coil a voltage of greater value than the voltage impressed on said welding transformer secondary winding to cause closure of said switch, said relay comprising an operating coil, means controlled by said switch connecting said relay coil across said reactor to cause operation of said relay in response to the flow of current through said welding circuit, and contacts controlled by said switch for disconnecting said welding transformer secondary winding from said auxiliary transformer in response to closing operation of said switch.

6. In a control system for a welding transformer comprising a primary winding and a secondary winding for supplying current to a welding circuit through an inductive reactor, the combination of a line switch operable to cause energization of said welding circuit through said transformer and said reactor, said line switch being provided with an operating coil, means for impressing through said reactor on said circuit a voltage below the normal open circuit voltage thereof, a relay for energizing said switch coil to cause closure of said switch, said relay comprising an operating coil, means for controlling the operation of said relay including contacts controlled by said switch connecting said relay coil across said reactor to cause energization of said relay coil in response to the flow of current through said reactor when said voltage below the normal open circuit voltage is impressed on said welding circuit, and further contacts controlled by said switch for disconnecting said welding circuit from said voltage impressing means in response to closing operation of said switch.

HENRY W. SNYDER.

REFERENCES CITED

The following references are of record in the file of this patent:

UNITED STATES PATENTS

| Number | Name | Date |
|---|---|---|
| 2,364,372 | Kenrick | Dec. 5, 1944 |
| 2,449,456 | Croco | Sept. 14, 1948 |

FOREIGN PATENTS

| Number | Country | Date |
|---|---|---|
| 749,634 | France | May 8, 1933 |